United States Patent
Shimizu et al.

(10) Patent No.: US 6,713,887 B2
(45) Date of Patent: Mar. 30, 2004

(54) INVERTER CONTROLLED GENERATOR SET

(75) Inventors: Motohiro Shimizu, Saitama (JP); Masashi Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/998,169

(22) Filed: Dec. 3, 2001

(65) Prior Publication Data

US 2002/0089310 A1 Jul. 11, 2002

(30) Foreign Application Priority Data

Jan. 5, 2001 (JP) ............................................. 2001-310

(51) Int. Cl.$^7$ .......................... H02K 7/02; H02K 23/60; H02P 15/00
(52) U.S. Cl. ................. 290/40 C; 290/40 A; 290/40 R
(58) Field of Search ............................. 290/40 A, 40 C, 290/40 R

(56) References Cited

U.S. PATENT DOCUMENTS

| | | | | |
|---|---|---|---|---|
| 3,303,097 A | * | 2/1967 | Mallinckrodt | 376/102 |
| 4,604,528 A | * | 8/1986 | Norton | 307/9.1 |
| 4,682,044 A | * | 7/1987 | Hotate et al. | 290/40 B |
| 4,694,238 A | * | 9/1987 | Norton | 322/28 |
| 4,794,898 A | * | 1/1989 | Kato | 123/339 |
| 4,973,896 A | * | 11/1990 | Shiga et al. | 322/28 |
| 4,992,672 A | * | 2/1991 | Norton | 307/10.1 |
| 5,057,764 A | * | 10/1991 | Fujimoto et al. | 322/14 |
| 5,140,960 A | * | 8/1992 | Fujimoto et al. | 123/339 |
| 5,166,538 A | * | 11/1992 | Norton | 307/10.1 |
| 5,703,410 A | * | 12/1997 | Maekawa | 290/40 C |
| 5,998,881 A | * | 12/1999 | Wind et al. | 290/40 A |
| 6,130,486 A | * | 10/2000 | Shimizu et al. | 290/40 C |
| 6,365,983 B1 | * | 4/2002 | Masberg et al. | 290/40 C |
| 6,573,614 B2 | * | 6/2003 | Doll | 290/40 C |
| 6,590,298 B1 | * | 7/2003 | Du Plessis | 290/40 C |
| 6,603,213 B1 | * | 8/2003 | Renner | 290/1 A |

FOREIGN PATENT DOCUMENTS

JP          11-308896          11/1999

* cited by examiner

Primary Examiner—Karl Tamai
Assistant Examiner—Pedro J. Cuevas
(74) Attorney, Agent, or Firm—Westerman, Hattori, Daniels & Adrian, LLP

(57) ABSTRACT

The operation of a generator is improved in the efficiency throughout a wider speed range.

The generator of a magnetic type is provided where a direct current output of a converter including semiconductor rectifying devices for rectifying the output of the generator is converted by an inverter to an alternating current form at a particular frequency. The conduction of thyristors is determined by a thyristor drive unit to control the voltage output of the converter to a target voltage level. The target voltage level is set to a positive value corresponding to the speed of the generator. The target voltage level is lowered when the generator is operated at a lower speed range and elevated when at a higher speed range. Accordingly, the output of the magnetic generator is increased substantially in proportion to the speed.

4 Claims, 5 Drawing Sheets

20% 80% (α)

US 6,713,887 B2

INVERTER CONTROLLED GENERATOR SET

BACKGROUND OF THE INVENTION

1. Field of the Invention

The present invention relates to a generator set having an inverter and more particularly, to a generator set having an inverter where a generator of particularly a magnetic type can be operated at high efficiency within a wider speed range.

2. Description of the Related Art

It has increasingly been common that an engine operated generator for use as an alternating current power source is equipped with an inverter for stabilizing the output frequency. For example, such a generator set having an inverter is disclosed in Japanese Patent Laid-open Publication (Heisei)11-308896 where an alternating current power is generated by an engine operated generator, converted into a direct current form, and converted again by the inverter into an alternating current form of a commercial frequency. Because its frequency does not depend on the speed of the engine, the output of the generator set having an inverter can be adjusted to a desired power output which is preset or determined to match the magnitude of load by controlling the speed of the engine.

FIG. 9 illustrates a power output characteristic of a generator of a magnetic type where the speed is a parameter. As shown, the curves A, B, and C represent the relationship between the voltage and the current of the output when the [revolution] speed of the generator is expressed by H, M, and L (H>M>L), respectively. The curves Ap, Bp, and Cp represent the outputs of the generator determined by the curves A, B, and C, respectively. The direct current voltage at the input of the inverter can thus be controlled to a target level V for maintaining the inverter output to match the load.

As apparent from the drawing, with the direct current voltage at the input of the inverter maintained at the target level V, the outputs of the generator at L, M, and H of the revolution are expressed by the points p', q', and r' respectively designated on the corresponding curves Ap, Bp, and Cp which are defined by the intersections between A and V, between B and V, and between C and V, respectively. The power output is almost a maximum level at M of the speed while is a pre-low level at L of the speed and a post-low level at H of the speed. More particularly, the speed should stay in a narrow range about M for allowing the generator to produce generally a maximum of the output or operate at an optimum efficiency.

When the speed of the engine is controlled for adjusting the output of the generator, it should be operated within a no-voltage-shortage range, e.g., as shown in FIG. 9, where the voltage is equal to or higher than a target level V. On the other hand, if the speed is too high, the power output will be reduced as a result of preferable utilization of the over-current side of the characteristic.

SUMMARY OF THE INVENTION

It is, hence, an object of the present invention to provide a generator set having an inverter which can be operated in a wider speed range while eliminating the foregoing drawbacks.

This allows the target voltage level to be set to a lower value at a lower range of the speed of the magnetic generator and a higher value at a higher range of the same. Accordingly, as the magnetic generator is increased in the voltage output substantially in proportion to the revolution, it can produce a voltage output of the target level at the lower range of the revolution. Also, its voltage output can be close to the maximum level without lowering the efficiency when the generator is operated at the higher range of the revolution. As a result, the useful range of the speed of the generator can be increased.

As a second feature of the present invention, a generator set having an inverter may further comprise an engine revolution controlling means for controlling the revolution of an engine to drive the generator so that the conduction rate of the semiconductor rectifying devices is converged on a predetermined target rate, wherein the controlling of the speed of the engine is implemented by adjusting the supply of fuel to the engine.

This allows the speed of the engine to be modified within a wider range thus controlling the conduction rate of the semiconductor rectifying devices to a desired level.

As a third feature of the present invention, the engine revolution controlling means may be arranged to decrease the speed of the engine when the deviation of the conduction rate from the target rate is positive and increase the same when negative. As a fourth feature of the present invention, a rate of change of revolution of the engine is greater at an increase than at a decrease thereof.

DETAILED DESCRIPTION OF THE PREFERRED EMBODIMENTS

Figure 1:
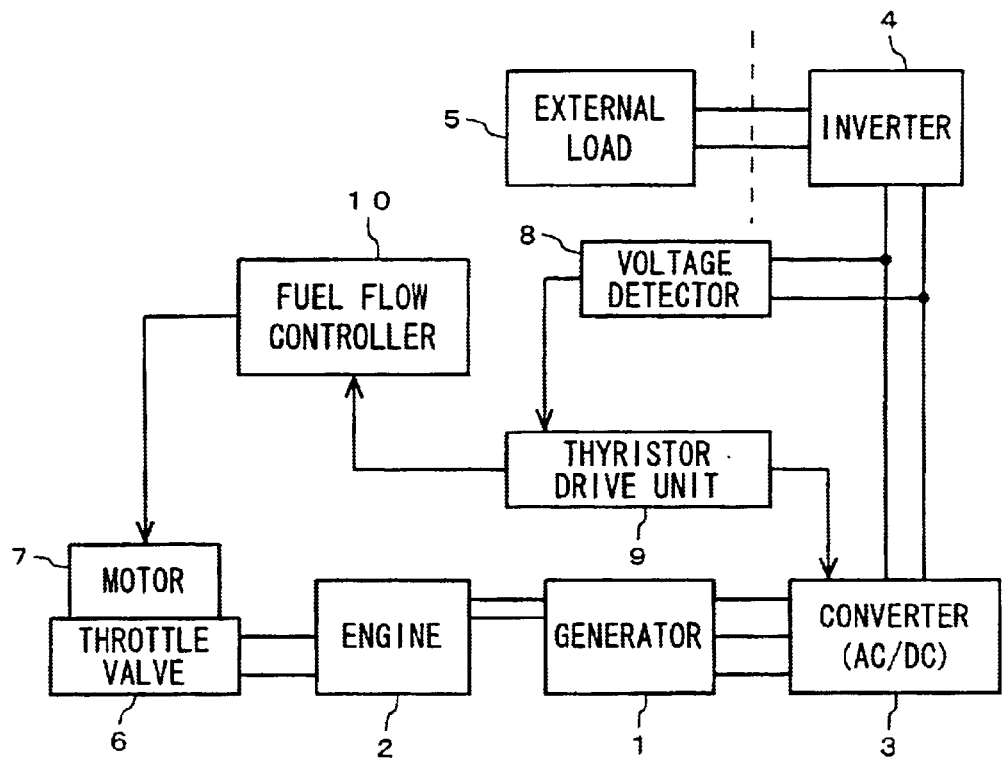
FIG. 1 is a functional block diagram of a generator set having an inverter showing one embodiment of the present invention.

An embodiment of the present invention will be described in more detail referring to the relevant drawings. FIG. 1 is a block diagram showing an arrangement of the generator set having an inverter of the embodiment. A magnetic type multi-pole generator 1 (referred to as simply a generator hereinafter) is driven by an (internal combustion) engine 2 to generate a multi-phase (commonly three-phase) alternating current power output. The alternating current power output is full-wave rectified to a direct current form by a converter 3 which comprises a rectifier circuit having thyristors (as semiconductor rectifier devices) connected in a bridge form. The direct current power output is then transferred to an inverter 4 which is connected at its output to and provides an external load 5 with a single-phase power output of a commercial frequency (e.g. 50 Hz). A stepping motor 7 is also provided for controlling the opening of a throttle valve 6 of the engine 2. More specifically, as the opening of the throttle valve 6 is controlled by the number of pulses, it determines the speed of the engine 2. The engine 2 maybe of a fuel injection type of which the speed is controlled by the duration of fuel injection.

A voltage detector 8 detects an output voltage of the converter 3. A thyristor drive unit 9 compares the output voltage of the converter 3 with a target voltage level (will be described later in more detail) and determines the conduction of thyristors in the converter 3 using a known manner so that the actual output voltage of the converter 3 detected by the voltage detector 8 is equal to the target voltage level. This allows the output of the converter 3 to stay at the target voltage level within the controlling range of conduction angle of the thyristors.

Figure 2:
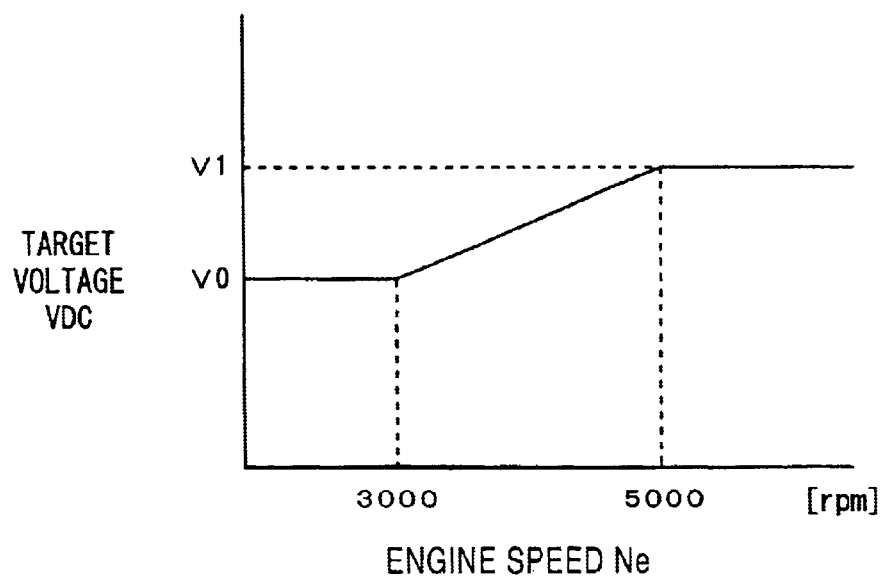
FIG. 2 is a diagram showing the relationship between the target voltage and the speed of an engine.

The target voltage level is predetermined as a function of the speed of the engine by the following manner. FIG. 2 is a diagram showing the relationship between the target voltage level and the speed of the engine. As shown, the target voltage level is set to V0 when the speed Ne of the engine is lower than 3000 rpm and V1, which is greater than V0, when higher than 5000 rpm. The target voltage level is gradually varied when the revolution Ne ranges from 3000 to 5000 rpm. For example, the target voltage level may be calculated from Equation 1, $$VDC = 145 + (Ne/256) \quad (1)$$

According to the equation 1, when the revolution Ne of the engine is 3000, 4300, or 5000 rpm, the target voltage level is 156.7 V, 161.8 V, or 164.5 V respectively. The calculation of the target voltage level is not limited to the above equation but maybe implemented by any appropriate manner where an optimum of the power output can be obtained at a given speed with relation to the characteristics of the generator.

Figure 3:
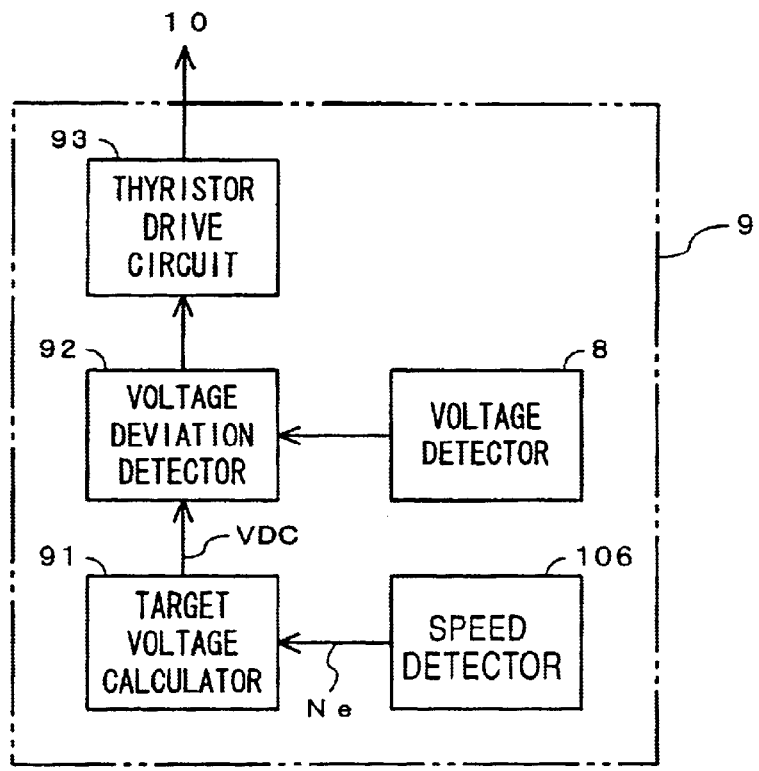
FIG. 3 is a functional block diagram showing a primary part of a thyristor drive unit.

FIG. 3 is a functional block diagram showing a primary part of the thyristor drive unit 9 assigned with the target voltage level. As shown, a speed detector 106 measures the engine speed Ne. The engine speed Ne is then transferred to a target voltage calculator 91 where it is used for calculating the target voltage level VDC from Equation 1. A voltage deviation detector 92 compares the direct current voltage from the voltage detector 8 or the voltage output of the converter 3 with the target voltage level VDC to determine a deviation from the target voltage level. The deviation is transferred to a thyristor drive circuit 93 for controlling the conduction of the thyristors as explained with FIG. 1.

Figure 4:
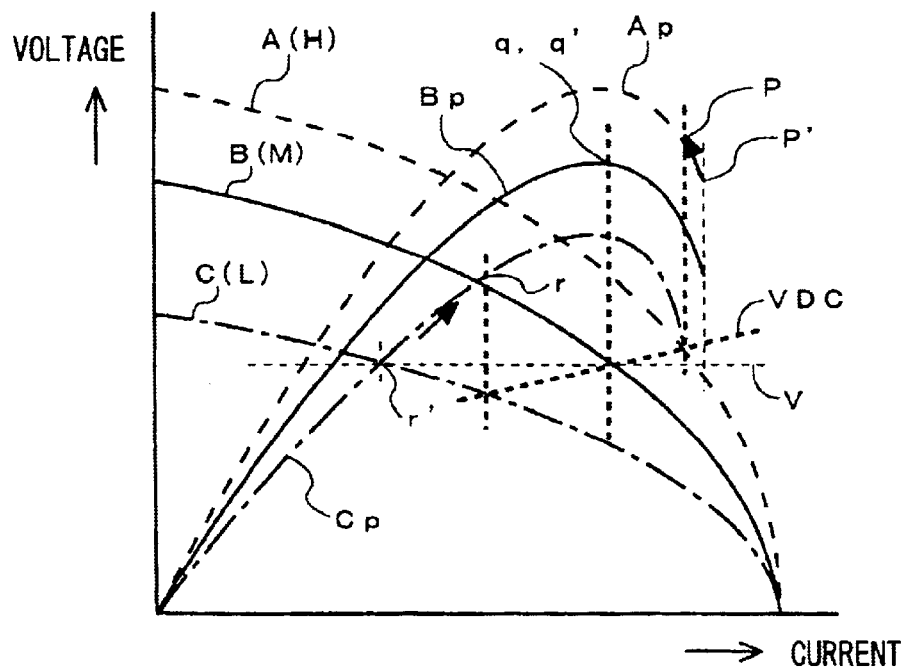
FIG. 4 is a diagram showing the relationship between the target voltage level and the power output of a magnetic generator in the embodiment.
Figure 9:
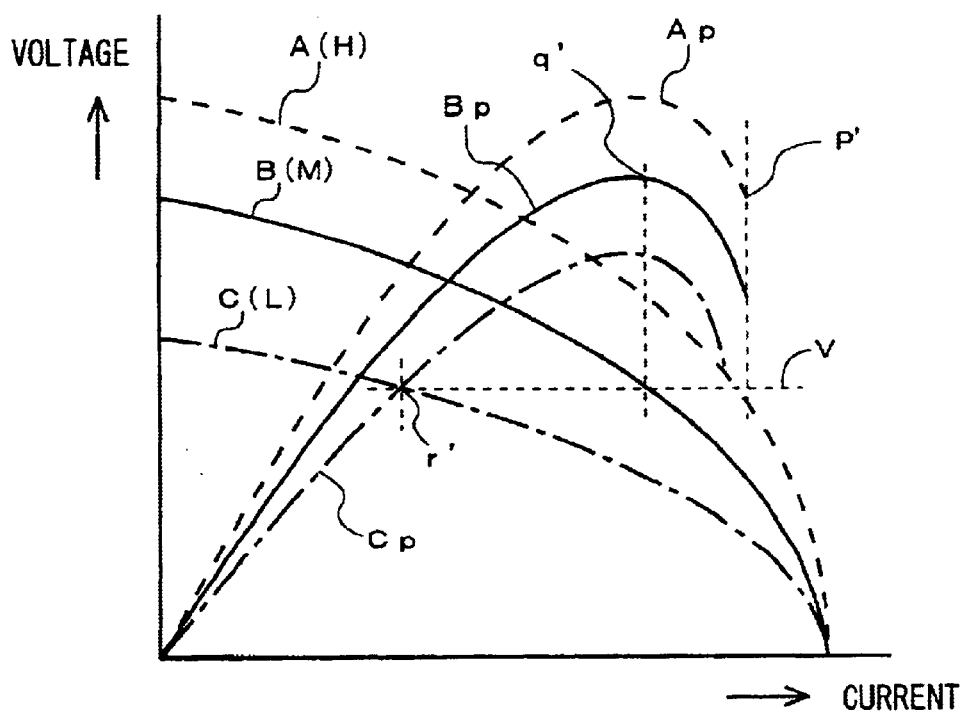
FIG. 9 illustrates the relationship between the target voltage level and the output of a conventional generator.

Because the target voltage level VDC is varied corresponding to the speed of the engine, the following advantage can be achieved. FIG. 4 illustrates the relationship between the target voltage level VDC and the output of the generator 1, where like items are denoted by like numerals as those shown in FIG. 9. The direct current voltage at the input of the inverter is controlled to be equal to the target voltage level VDC. As is apparent, while the direct current voltage level at the input of the inverter is maintained equal to the target voltage level VDC, three different outputs of the generator at L, M, and H of the revolution are expressed by the points p, q(=q'), and r on the curves Ap, Bp, and Cp, respectively. As compared with the prior art where the target voltage level is set to a fixed value V, the output at a lower speed L is increased from r' to r denoted by the arrow and at a higher speed H from p' to p. Also, the output at a medium speed M is substantially at its maximum. More specifically, a high level of the output can be obtained throughout a wider speed range. In an experimental example, the speed range to be used actually was increased by generally 200 rpm.

As the target voltage level VDC is varied, the input voltage of the inverter 4 may change. This change can be offset more or less by the inverter 4 equipped with a voltage controlling function such as PMW. The PMW technique allows the input voltage of the inverter 4 to stay higher than the least required level but not exceeding the permissive withstand voltage level of the semiconductor devices in the inverter 4.

Figure 5:
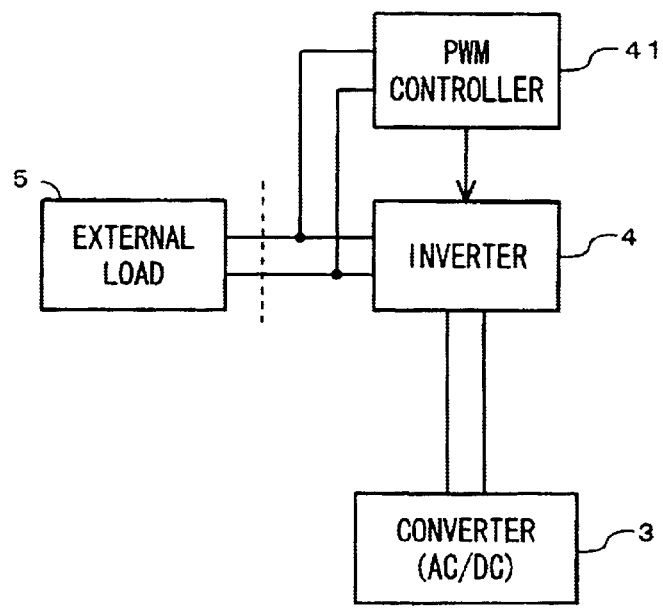
FIG. 5 is a functional block diagram of a primary part of the generator set having an inverter with an output voltage controller of the inverter.

FIG. 5 is a block diagram showing the voltage controlling function in the inverter 4, where like components are denoted by like numerals as those shown in FIG. 1. As shown, a PWM controller 41 detects the voltage output of the inverter 4 and carries out a PWM action for maintaining the voltage output at a predetermined level.

Figure 6:
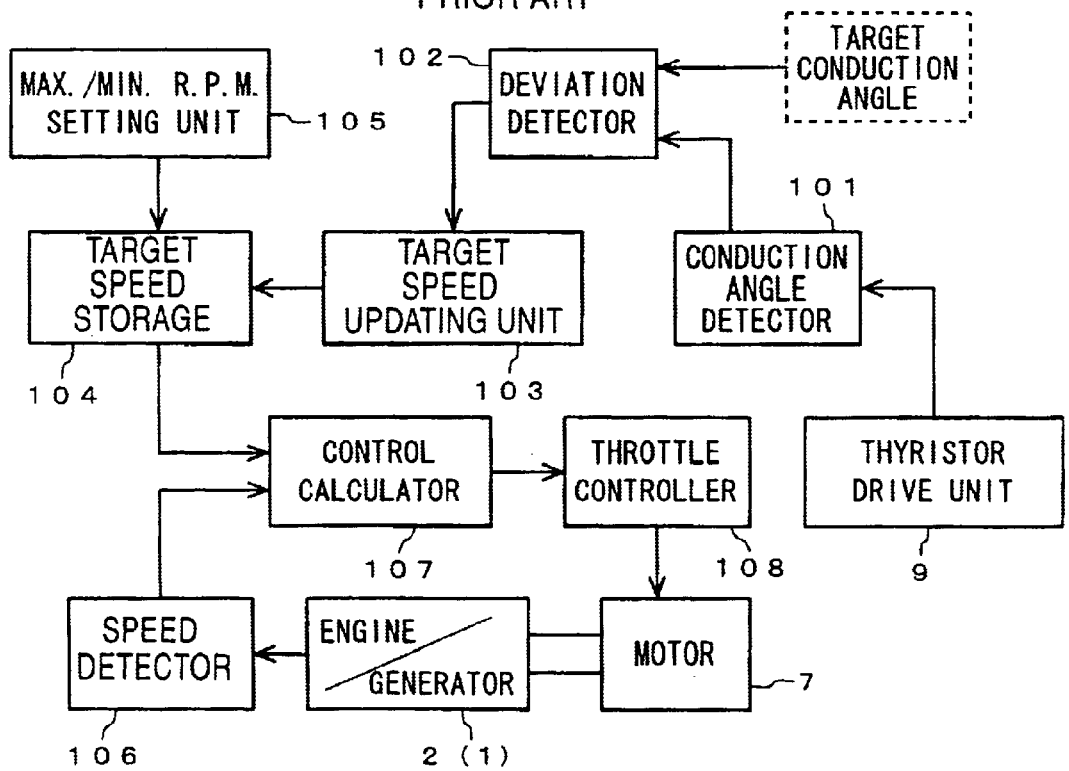
FIG. 6 is a functional block diagram of a primary part of a fuel flow controller.

A fuel flow controller 10 is provided having the following arrangement. FIG. 6 is a functional block diagram of a primary part of the fuel flow controller 10. A thyristor conduction angle detector 101 detects a conduction angle of the thyristors from the control signal which is transferred from the thyristor drive circuit 93 in the converter 3. The conduction angle is continuously measured at equal intervals of time to calculate its average. The average conduction angle may preferably be a moving average of consecutive data (e.g. of ten times).

The average conduction angle determined by the thyristor conduction angle detector 101 is transferred to a deviation detector 102 where a deviation of the average from a target conduction angle is calculated. The deviation indicates whether or not the generator 1 is operated to produce a generous margin of the output. For the purpose, the target conduction angle may be set to 80%. The target conduction angle like a common target level has a hysteresis. The target conduction angle may be a fixed degree or may be varied depending on the temperature of the engine 2. For example, when the temperature of the engine 2 is low, the target conduction angle is decreased. As its engine 2 is adjusted to a desired revolution so that the deviation detected by the deviation detector 102 is zero, the generator 1 can be operated to produce a generous margin of the output.

Figure 7:
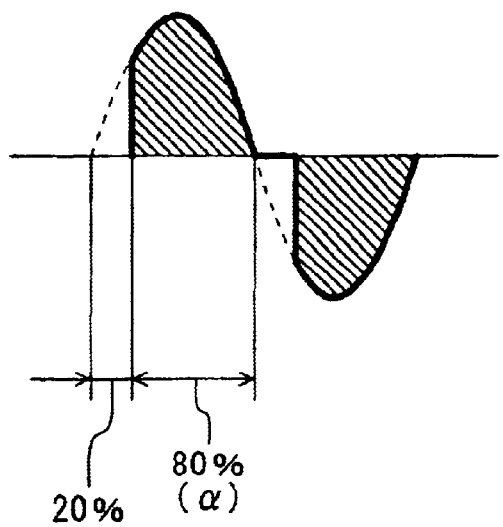
FIG. 7 is an explanatory view showing the angle of conduction of the thyristors (the rate of conduction of semiconductor devices)

FIG. 7 illustrates a waveform of the thyristor output of the converter 3 driven with the conduction angle of 80%. As shown, the conduction angle $\alpha$ is an electrical angle corresponding to a duration for conducting the thyristors and can thus be determined by a known manner.

A target engine speed updating unit 103 includes a table of speed adjustment for determining the speed adjustment in response to the deviation received as a readout address from the deviation detector 102.

Figure 8:
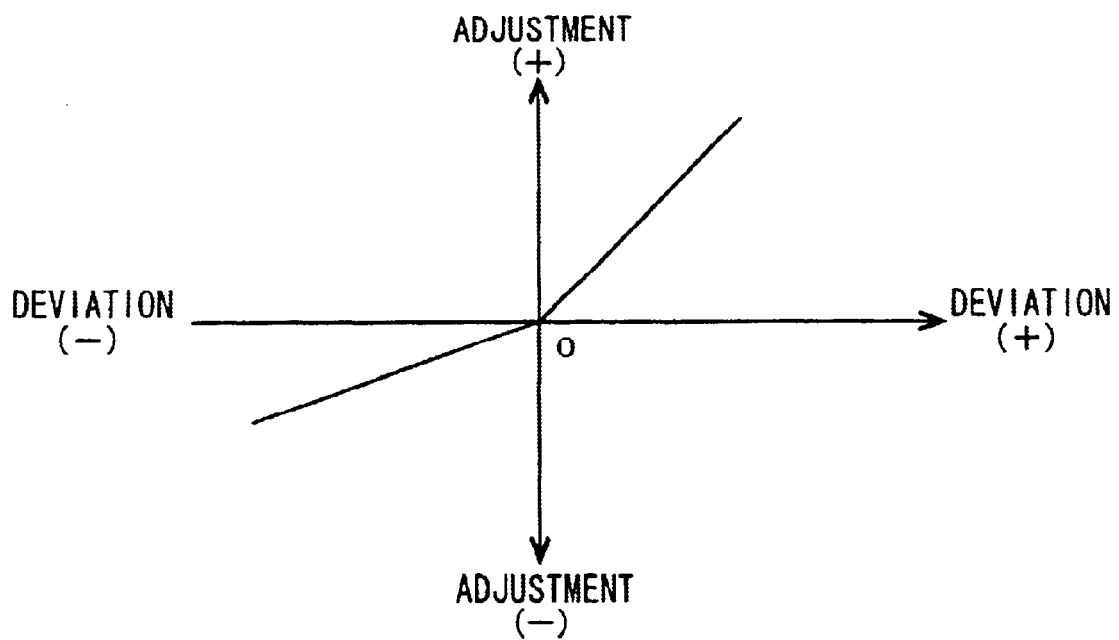
FIG. 8 illustrates the relationship between the deviation of the conduction angle and the adjustment of the target revolution.

FIG. 8 illustrates the relationship between the deviation and the adjustment of revolution. The deviation is a difference between the actual conduction angle and the target conduction angle, "actual conduction angle-target conduction angle". The adjustment of revolution determined from the deviation is greater when the deviation is a positive value than that when a negative value. When the deviation is positive, that is, the angle of conduction exceeds the target conduction angle (80%), it is judged that the generator 1 is operated with a less margin. This requires the output of the generator 1 to rapidly respond to a change on the load. When the deviation is negative, the generator 1 runs with a generous margin. Accordingly, the speed can favorably be inhibited from largely increasing or decreasing which is caused by the effect of overshoot derived from excessive response.

Returning to FIG. 6, the target speed adjustment value is transferred from the target speed updating unit 103 to a target speed storage 104 where it is added with a target speed stored so that a resultant sum is an updated speed. The target speed is updated not to depart from a range between the maximum and the minimum set in a maximum/minimum revolution setting unit 105. More specifically, if the target speed after addition with the target speed adjustment value is out of the range, the maximum or minimum of the range will be assigned as the adjusted target speed. It is noted that because the thyristor conduction angle may be varied at a lower speed by any small change in the revolution, the minimum of the range has to be specified to ensure the stability of operation with no load or less load.

The speed of the generator 1 is measured by the speed detector 106. From the actual speed received from the revolution detector 106 and the target speed received from the target revolution storage 104, a control calculator 107 calculates a control value such that the deviation of the actual speed from the target speed is zero, using a known manner (e.g., comparison, integration, or differentiation). A throttle controller 108 is connected to a stepping motor 7 and responsive to a resultant output of the control calculator 107 for calculating the number of pulses to drive the stepping motor 7. The stepping motor 7 is thus driven by the number of pulses to change the opening of the throttle valve 6.

In the embodiment, the average conduction angle for the thyristor bridged rectifying circuit is favorably controlled to a predetermined level (for example, 80%) by modifying the speed of the engine 2 to determine the output of the converter 3. This allows the generator 1 to be constantly operated to produce a generous margin of the output. More particularly, when the load is increased, the voltage output of the converter 3 declines. In response to a signal of the declination, the conduction angle of the thyristors can be increased to offset an increase in the load. Simultaneously, as the conduction angle increases, the speed of the engine 2 can be increased gradually, but not rapidly. Because the engine is not frequently changed in speed, its generation of noise and consumption of fuel can successfully be reduced.

Also in the embodiment, the voltage output of the converter is measured at the input of the inverter. This eliminates the need for calculating an optimum speed of the generator or engine with the use of parameters including the effective power output of the inverter, the conversion efficiency of the inverter, the power output for a speed, and variations between the components in the generator or the effective power detector, hence facilitating the process of controlling. Moreover, the converter in the embodiment for rectifying the current output of the generator is not limited to the described thyristor bridged type but may be of any other voltage controlled type such as DC—DC voltage conversion type.

As set forth above, the feature defined in claim 1 of the present invention allows the target voltage level to be decreased when the generator runs at a lower number of revolutions, thus enabling the operation at a lower speed range. Also, as the target voltage level is increased when the generator runs at a higher speed, the operation at a higher speed range can be ensured without lowering the efficiency.

What is claimed is:

1. An inverter controlled generator set having a converter composed of semiconductor rectifying devices for rectifying the power output of a magnetic generator, comprising:

a semiconductor rectifying device driving means for controlling the conduction of the semiconductor rectifying devices to maintain the voltage output of the converter at a target voltage level, wherein the target voltage level is target reference level to stabilize the voltage output of the converter;

an inverter for converting a direct current output of the converter into an alternating current form at a particular frequency;

a speed detecting means for detecting the speed of the magnetic generator; and a target voltage setting means for setting the target reference level to be low when the detected speed is low and to be high when the detected speed is high so that the voltage input of the inverter shows a stabilized positive characteristic to the detected speed.

2. An inverter controlled generator set according to claim 1, further comprising:

a conduction rate detecting means for detecting the conduction rate of the semiconductor rectifying devices; and an engine speed controlling means for controlling the speed of an engine to drive the generator so that the conduction rate is converged on a predetermined target rate, wherein the controlling of the speed of the engine is implemented by adjusting the supply of fuel to the engine.

3. An inverter controlled generator set according to claim 2, wherein the engine speed controlling means is arranged to decrease the speed of the engine when the deviation of the conduction rate from the target rate is positive and increase the same when negative.

4. An inverter controlled generator set according to claim 3, wherein a rate of change of the speed of the engine is greater at an increase than at a decrease thereof.

* * * * *